United States Patent [19]

Nakajima et al.

[11] 3,855,127
[45] Dec. 17, 1974

[54] FILTER CASE ASSEMBLY

[76] Inventors: Tethuo Nakajima, 7-7, Nishikoiwa 3-chome; Yoshihisa Maeda, 10-14 Umeda 2-chome, both of Tokyo, Japan

[22] Filed: Oct. 24, 1972

[21] Appl. No.: 300,371

[52] U.S. Cl.................. 210/90, 210/130, 210/239, 210/456
[51] Int. Cl............................................ B01d 35/00
[58] Field of Search ............ 210/90, 130, 133, 232, 210/440, 443, 239, 429, 430, 446, 448, 456

[56] References Cited
UNITED STATES PATENTS

| | | | |
|---|---|---|---|
| 3,591,002 | 7/1971 | Rosaen | 210/456 X |
| 3,061,106 | 10/1962 | Bradbury | 210/232 |
| 2,897,966 | 8/1959 | Humbert, Jr. | 210/133 X |
| 2,354,380 | 7/1944 | Kasten | 210/443 X |
| 3,342,332 | 9/1967 | Kudlaty | 210/130 X |
| 3,405,805 | 10/1968 | Hatter | 210/130 |

FOREIGN PATENTS OR APPLICATIONS
258,509    4/1913    Germany ........................... 210/239

*Primary Examiner*—Frank A. Spear, Jr.
*Assistant Examiner*—Robert G. Mukai
*Attorney, Agent, or Firm*—McGlew and Tuttle

[57] ABSTRACT

A filter case assembly includes a filter housing having a top opening and side walls with an inlet opening at one end and a discharge opening at the opposite end. A hollow cylindrical filter is disposed within the housing between the inlet opening and the discharge opening and a cover closes the top. A valve body is carried by the cover and includes a first conduit portion connected to the interior of the filter and a second conduit portion connected to the discharge opening. The valve body carries an operating relief valve mechanism and it is provided with an extension or collar providing a mounting opening for a pressure indicator which may also be carried within the filter housing.

2 Claims, 6 Drawing Figures

3,855,127

FILTER CASE ASSEMBLY

BACKGROUND OF THE INVENTION

1. Field of the Invention

This invention relates in general to filter construction and in particular, to a new and useful filter case. Having a filter element and with a relief valve body mounting a differential pressure indicator which is carried by the case cover.

Since each component member of the filter assembly including a relief valve and differential pressure indicator has previously been separately and independently assembled the invention provides a combined after filter assembly having improved a flow characteristics and may be of a similar size.

2. Description of the Prior Art

Prior to the present invention it was common to use a filter element in association with a separate valve body and with a separate differential pressure indicator which had to be assembled in a line connected to the filter.

SUMMARY OF THE INVENTION

The present invention is an improvement over the prior art primarily in the construction of filter housing assembly in which the filter is mounted within a housing and the housing top is covered by a cover which carries a valve body which may be oriented directly in the filter housing so as to connect the interior of the filter with the discharge opening of the housing. The valve body carries a valve operating mechanism and also carries means for mounting a differential pressure gauge.

Accordingly, it is an object of the invention to provide an improved filter housing assembly which includes a valve body carried by the housing cover with the operating valve mechanism thereon.

A further object of the invention is to provide a filter housing assembly which is simple in design, rugged in construction and economical to manufacture.

For an understanding of the principles of the invention, reference is made to the following description of typical embodiments thereof as illustrated in the accompanying drawing.

BRIEF DESCRIPTION OF THE DRAWINGS

The accompanying drawings show an embodiment according to this invention.

FIG. 3 is a front longitudinal section view;

FIG. 4 is a plan view of FIG. 3;

FIG. 5 is a sectional view taken along the line V—V of FIG. 3; and

FIG. 6 is a sectional view taken along the line VI—VI of FIG. 3.

GENERAL DESCRIPTION OF THE PREFERRED EMBODIMENT

Figure 1:
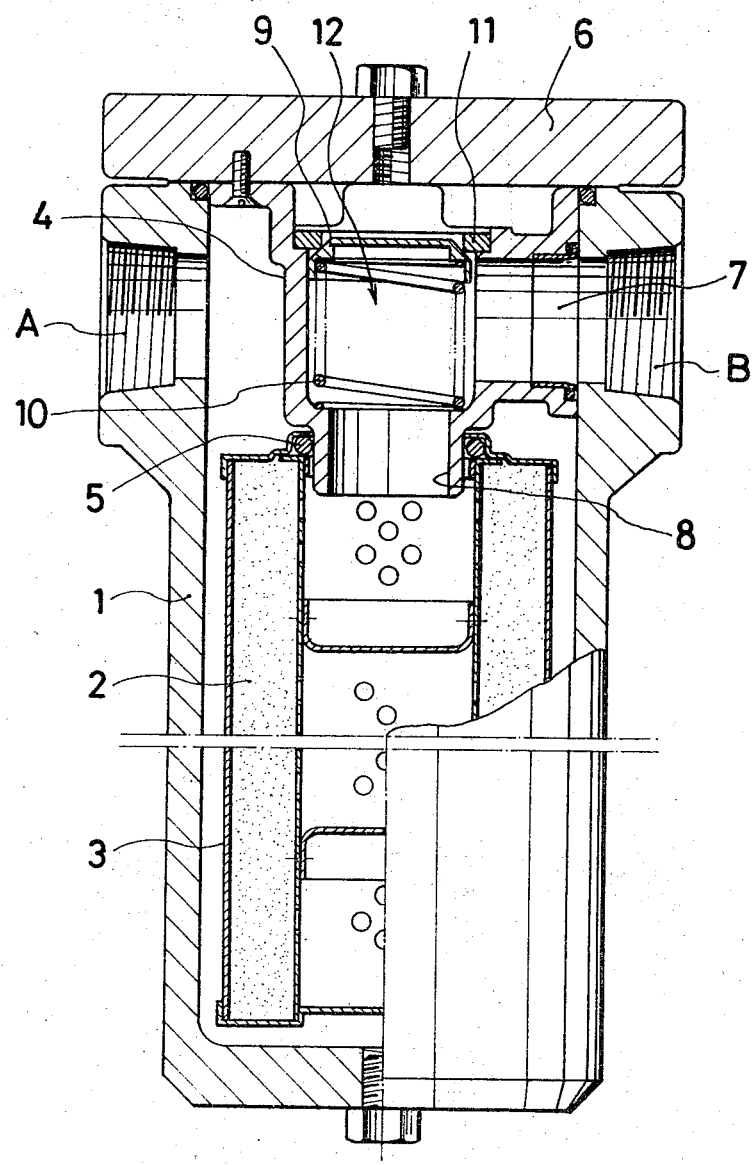
FIG. 1 is a longitudinal section view showing the consturction of a filter case according to this invention.

Referring to the drawings in particular the invention embodied therein comprises a filter casing or housing construction or assembly which comprises a cylindrical casing 1 which carries a holder 3 for a filter element 2 of hollow cylindrical construction which is arranged between a housing inlet A and a housing discharge at a diametrically opposite side of the side walls of the casing.

In accordance with the invention, a valve body 4 is carried by a cover 6 which covers an open top of the casing 1. When the cover is secured in position a first conduit portion of the valve body 4 which extends downwardly terminates in a port 8 which is positioned within the central portion of the filter holder 3 and is sealed to the filter over an O-ring 5. The valve body is secured to the cover 6 such as by threaded bolts.

As best seen in FIGS. 3 to 6 the valve body 4 includes a second conduit portion which terminates in a port 7 which is aligned with the outlet or discharge B. The valve contains the usual operating valve mechanism for a relief valve including a relief valve element or disk 12 which is biased upwardly by a spring 10 against a keep plate or washer 11.

Figure 2:
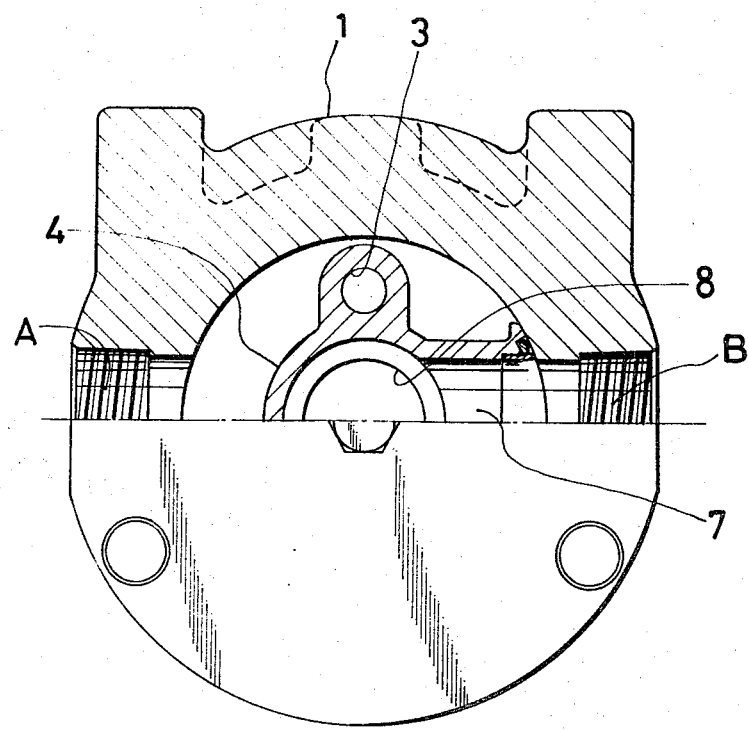
FIG. 2 is a plan view of FIG. 1 showing a half-section.
Figure 4:
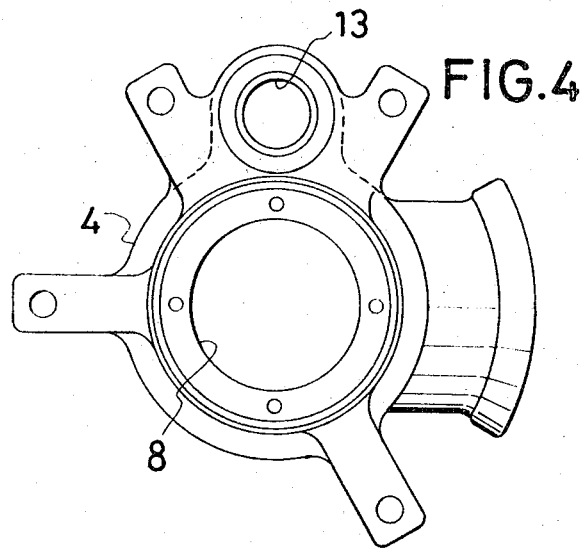
FIGS. 3 to 6 are drawings showing the construction of a valve body.
Figure 5:
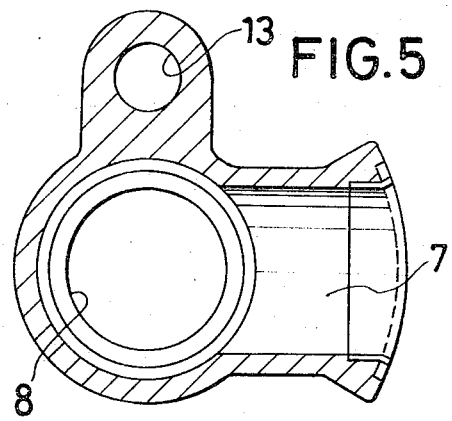
Figure 3:
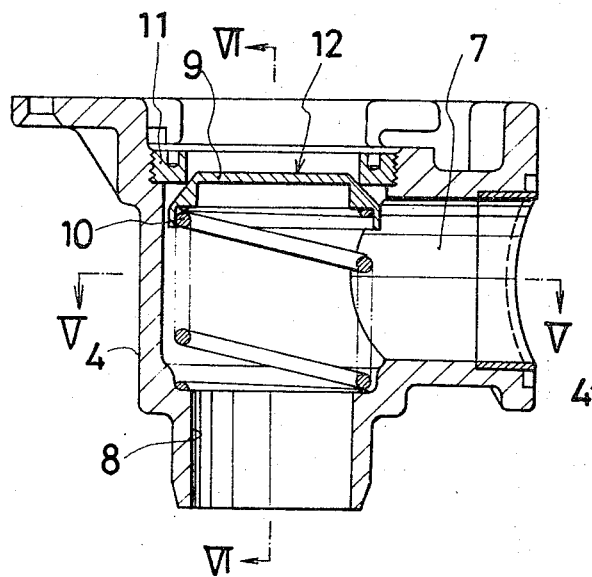
Figure 6:
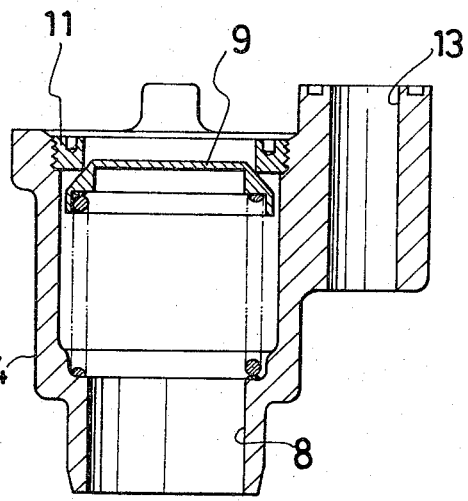

In accordance with a feature of the construction the valve body as shown in FIGS. 2, 4 and 5 includes a laterally extending portion or collar having an opening 13 for mounting a differential pressure indicator (not shown). A differential pressure indicator is provided to sense the drop in pressure produced by the filter and with the inventive arrangement it may be mounted directly to the valve body.

In the embodiment shown, the valve body 4 is mounted so as to be detachably secure to the cover 6. The construction provides the following advantages and features:

1. The filter flow characteristic and a relief valve flow characteristic are improved.

2. The outflow of dust to the secondary side of the filter due to the opening of the relief valve, can be prevented to the minimum.

3. The opening and closing of the valve due to variation of flow rate are decreased as compared with the conventional relief valve provided on the center axis of the fluid outlet and inlet.

4. Excellent flow characteristic permit the decrease of filtration area and the reduction in size of the whole filter case.

5. Since the differential pressure produced by the filter is not affected by the working pressure, as much as each component member of the filter element, relief valve and differential pressure indicator separately, a more efficient structure results and standardization of parts can be effected, so that a mass production by die casting can take place. The fluid outlet and inlet can easily be reversed by converting the direction of mounting said filter case assembly.

6. The production by die casting mentioned in the preceding item 5) seldom produces dust and other impurities on the secondary side of the filter as compared that by the conventional casting.

While specific embodiments of the invention have been shown and described in detail to illustrate the application of the principles of the invention, it will be understood that the invention may be embodied otherwise without departing from such principles.

What is claimed is:

1. A filter case assembly, comprising a filter housing having an open top and a side wall with an opening on one side and a discharge opening on the opposite side, a hollow cylindrical filter disposed in said housing between said inlet opening and said discharge opening, a cover closing the top of said housing and a valve body carried by said cover having a substantially central cylindrical body portion at least as wide as said inlet opening and disposed in the flow path between said inlet and outlet openings and forming a buffer against the working pressure flow from said inlet to said outlet, said body having a first hollow tubular portion extending in the direction of flow from said inlet to said outlet from said cylindrical body to said outlet and a second tubular portion extending from said cylindrical body downwardly into the bore of said hollow cylindrical filter, said filter housing having a valve in the flow passage between said first and second tubular portions with a valve seat in said flow passage, a relief valve movable over said seat and, spring means biasing said relief valve in a predetermined direction in respect to said seat, said cover being reversible along with said cylindrical body and said first and second tubular members in order to connect said first tubular member from said cylindrical valve body to said inlet with the connection of said second tubular portion remaining in the bore of said hollow cylindrical filter whereby to change the flow direction through said filter case assembly.

2. A filter according to claim 1, wherein said valve body includes an extension having an opening therethrough for mounting a differential pressure indicator.

* * * * *